(12) United States Patent
Villacres Mesias et al.

(10) Patent No.: US 10,814,771 B2
(45) Date of Patent: Oct. 27, 2020

(54) CARABINER WITH CANTILEVER SPRING

(71) Applicant: FORD GLOBAL TECHNOLOGIES, LLC, Dearborn, MI (US)

(72) Inventors: Diego Fabricio Villacres Mesias, Toluca (MX); Eric Bryan Arellano Aguilar, Azcapotzalco (MX); Jose Nicolas Juarez Espinoza, Cuajimalpa de Morelos (MX)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 16/129,202

(22) Filed: Sep. 12, 2018

(65) Prior Publication Data
US 2020/0079271 A1    Mar. 12, 2020

(51) Int. Cl.
*B60P 7/08* (2006.01)
*B60R 7/08* (2006.01)

(52) U.S. Cl.
CPC .............. *B60P 7/0807* (2013.01); *B60R 7/08* (2013.01)

(58) Field of Classification Search
CPC ..... B60P 7/0807; B60R 7/08; B60R 13/0206; F16B 45/02; A63B 29/00
USPC ................ 410/101, 102, 106, 110, 112, 116; 296/1.08; 294/82.19; 24/599.4, 599.6, 24/599.7, 599.8, 600.9, 601.2; D8/356
See application file for complete search history.

(56) References Cited

U.S. PATENT DOCUMENTS

| | | | |
|---|---|---|---|
| 978,734 A | 12/1910 | Gordon | |
| 1,622,971 A * | 3/1927 | Porter | F16B 45/02 294/82.19 |
| 2,121,440 A | 6/1938 | Morrison | |
| 2,787,435 A | 4/1957 | Shields | |
| 5,507,460 A | 4/1996 | Schneider | |
| 5,624,094 A | 4/1997 | Protz, Jr. | |
| 5,639,140 A | 6/1997 | Labrash | |
| 5,664,304 A | 9/1997 | Tambornino | |
| 5,769,294 A * | 6/1998 | Heinz | B60R 7/02 248/294.1 |
| 5,984,250 A | 11/1999 | Connor | |
| 7,837,248 B2 | 11/2010 | Nedelman | |
| 8,480,690 B2 * | 7/2013 | Vijayanagar | A61B 17/06061 24/598.2 |
| 8,763,216 B2 | 7/2014 | Codega | |
| 8,973,961 B1 | 3/2015 | Setsuda et al. | |
| 9,695,975 B2 | 7/2017 | Ogawa | |
| 9,797,432 B2 | 10/2017 | Inkavesvaanit | |
| 2004/0084918 A1 | 5/2004 | Brandt et al. | |

(Continued)

FOREIGN PATENT DOCUMENTS

DE    102013100661 A1    7/2014
EP        2329992 A2    6/2011

(Continued)

OTHER PUBLICATIONS

English Machine Translation of DE102013100661A1 dated Jul. 24, 2014.

*Primary Examiner* — Stephen T Gordon
(74) *Attorney, Agent, or Firm* — David Coppiellie; King & Schickli, PLLC

(57) ABSTRACT

A carabiner includes a (a) a hook, (b) a gate including a cantilever spring and (c) a first pivot connecting the gate to the hook. A second pivot also connects the distal or free end of the cantilever spring to the hook.

17 Claims, 17 Drawing Sheets

(56) References Cited

U.S. PATENT DOCUMENTS

| | | |
|---|---|---|
| 2005/0193531 A1 | 9/2005 | Chang |
| 2005/0244242 A1* | 11/2005 | Johnson ................ B60P 7/0807 410/101 |
| 2006/0103186 A1 | 5/2006 | Sturt et al. |
| 2007/0183860 A1* | 8/2007 | Smith ................... B60P 7/0807 410/110 |
| 2009/0183347 A1 | 7/2009 | Abels |
| 2011/0113604 A1 | 5/2011 | Chu |
| 2017/0129412 A1 | 5/2017 | Lewis et al. |

FOREIGN PATENT DOCUMENTS

| | | |
|---|---|---|
| EP | 2062783 B1 | 3/2014 |
| EP | 2604870 B1 | 5/2016 |

* cited by examiner

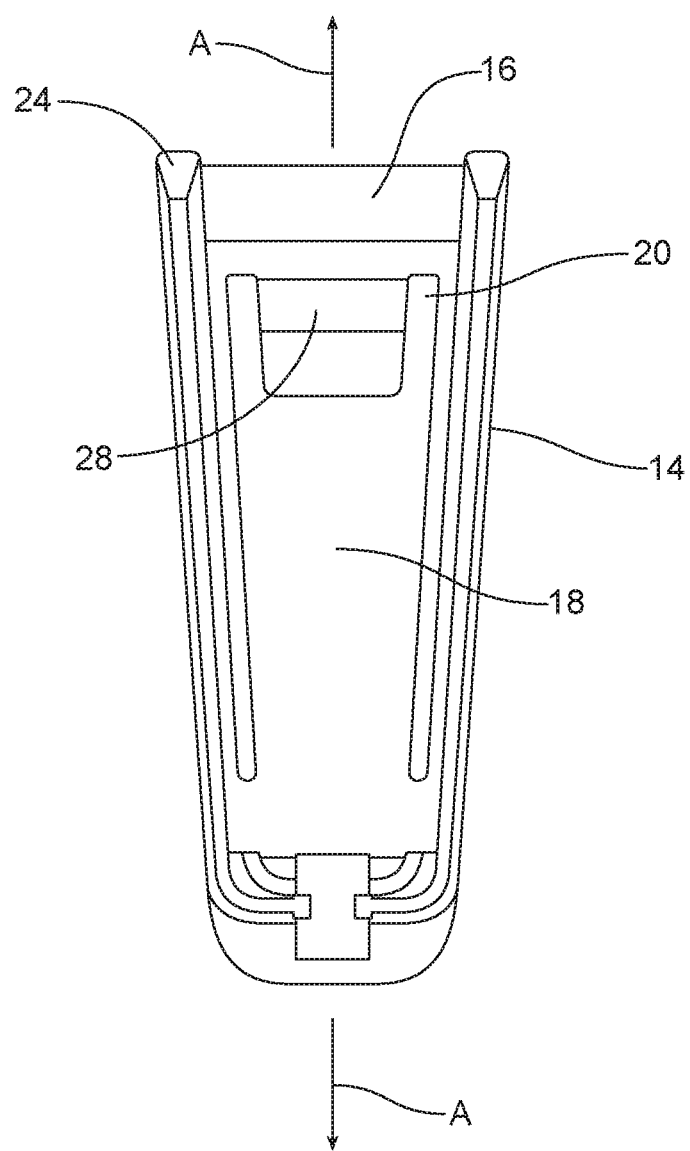

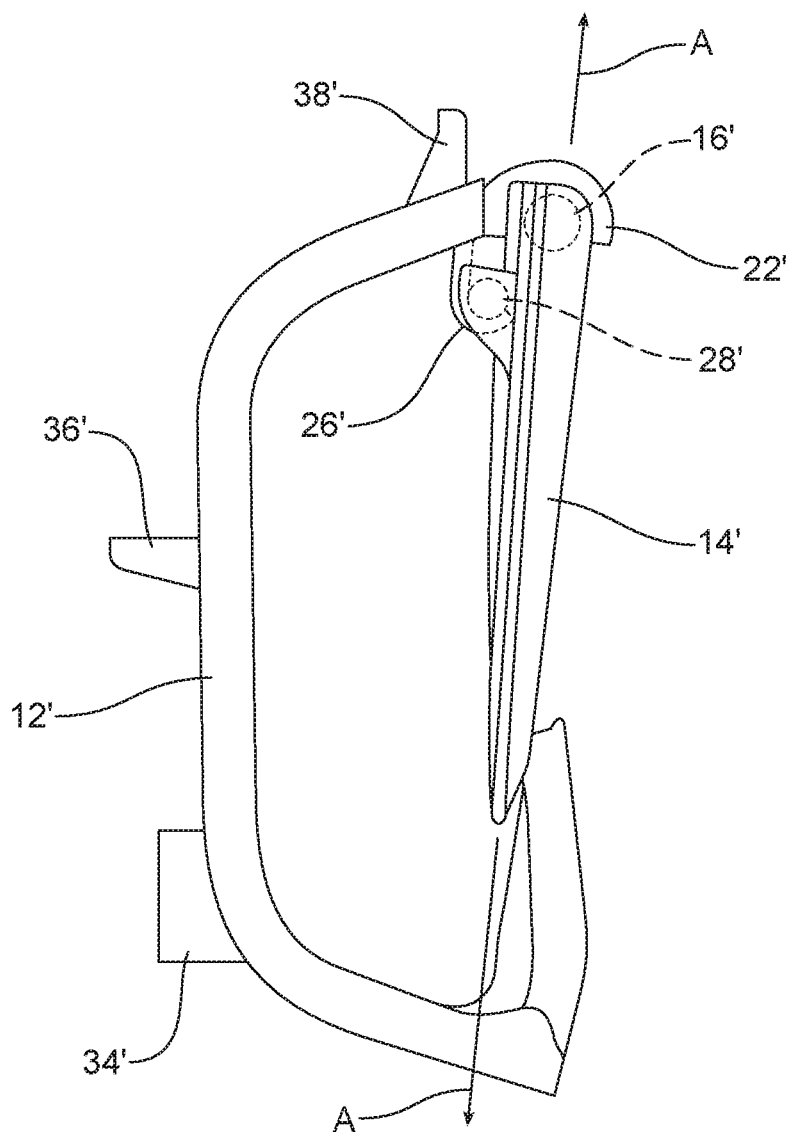

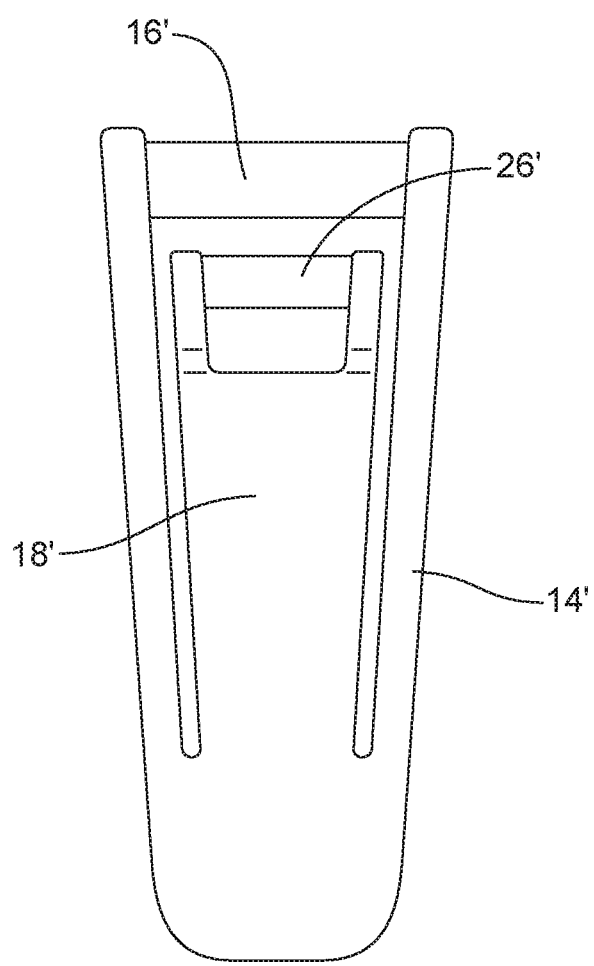

CARABINER WITH CANTILEVER SPRING

TECHNICAL FIELD

This document relates generally to the shackle field and more particularly to a new and improved carabiner incorporating a gate having a cantilever spring. Such a carabiner has many uses including as a tie down in a motor vehicle.

BACKGROUND

Current utility vehicles such as sport utility vehicles, hatchbacks and mini vans feature either closed loop cargo tie downs or open, grocery bag hooks. Such features are commonly located in the quarter trim panels, load floor or lift gate scuff plates.

Closed loop tie down anchors require their counter part to either be a line, rope, strap or clipping hook in order for them to be coupled. They are also commonly located under the belt line not far from the cargo load floor. This limits the amount of items you can attach to features of this type.

Grocery hooks and open hooks, on the other hand, are typically located higher in the vehicle but items hung there can detach spontaneously under certain road and driving conditions. Additionally they are designed to withstand very limited loads which affect their versatility.

This document relates to a new and improved carabiner that includes a gate having a cantilever spring. The carabiner has many uses including as a substitute for state of the art closed loop cargo tie downs and open, grocery bag hooks in a motor vehicle.

SUMMARY

In accordance with the purposes and benefits described herein, a new and improved carabiner is provided. That carabiner comprises: (a) a hook, (b) a gate including a cantilever spring and (c) a first pivot connecting the gate to the hook.

The hook may include a first receiver receiving and holding the first pivot. That first pivot may be integral with the gate. The hook may also include a second receiver. The cantilever spring may include a second pivot wherein the second pivot is received and held in the second receiver.

The first pivot may be parallel to the second pivot. The first pivot and the second pivot may also be perpendicular to a longitudinal axis of the gate. In one or more embodiments, the first pivot and the second pivot may be aligned with the longitudinal axis of the gate. In one or more embodiments, the first pivot may be a first cantilevered shaft. In one or more embodiments, the second pivot may be a second cantilevered shaft.

In one or embodiments, the first pivot may be aligned with the longitudinal axis of the gate and the second pivot may be offset from the longitudinal axis of the gate. In one or more of those embodiments, the second pivot may be offset toward the hook. Further, in one or more of those embodiments, the first pivot may be a first cantilevered shaft and the second pivot may be a second cantilevered shaft.

In one or more embodiments of the carabiner, the gate, the cantilevered spring, the first pivot and the second pivot may all comprise an integral one-piece body.

In one or more of the many possible embodiments of the carabiner, the hook may include at least one mounting boss. Still further, the hook may include a locating rib. In addition, the carabiner may further include a fastener received in the mounting boss. Still further, a concave housing may receive and hold the hook in a trim panel such as commonly found in a motor vehicle including, but not necessarily limited to, along a quarter trim panel, a C-pillar upper trim panel, a D-pillar trim panel or a lift gate trim panel/scuff plate.

In the following description, there are shown and described several preferred embodiments of the carabiner. As it should be realized, the carabiner is capable of other, different embodiments and its several details are capable of modification in various, obvious aspects all without departing from the carabiner as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the carabiner and together with the description serve to explain certain principles thereof.

FIG. 1a is a side elevational view.

FIG. 1b is a front elevational view.

FIG. 1c is a rear elevational view.

FIG. 1d is a front perspective view.

FIG. 1e is a partially cut-away front perspective view illustrating the gate of the carabiner in respective closed and opened positions.

FIGS. 2a-2c are three detailed views of the gate of the carabiner illustrated in FIGS. 1a-1e.

More particularly, FIG. 2a is a front elevational view.

Figure 2B:
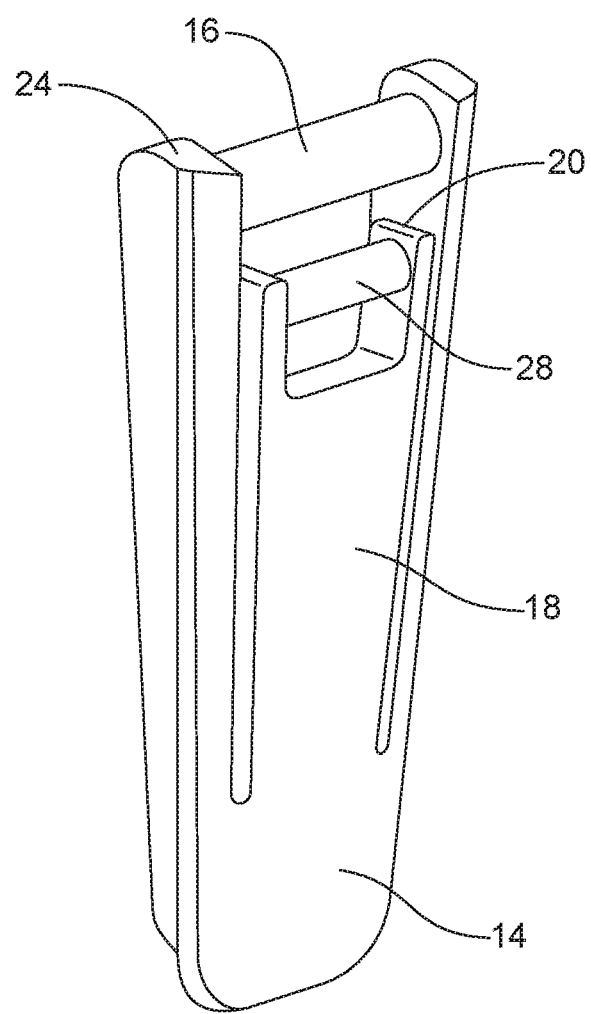

FIG. 2b is a front perspective view.

Figure 2C:
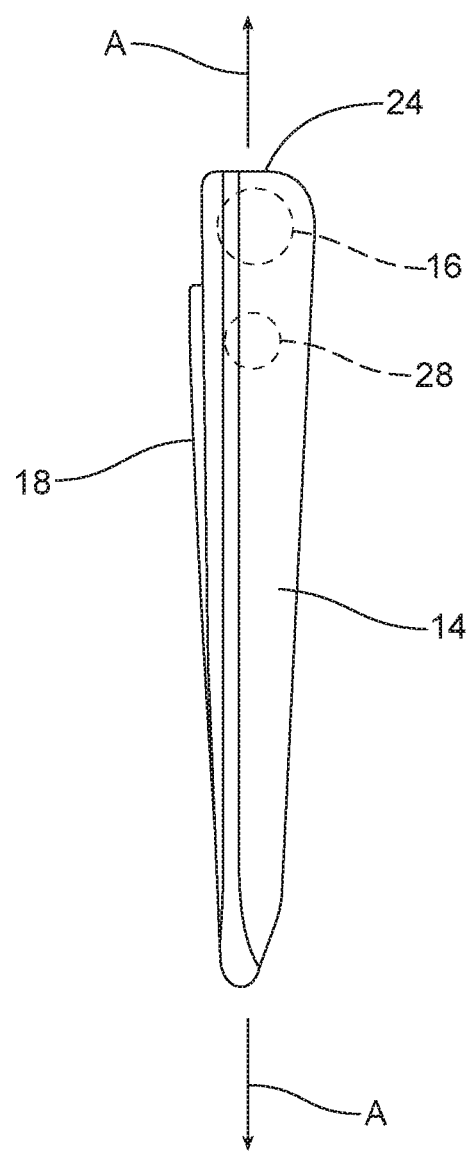

FIG. 2c is a side elevational view.

FIG. 3a is a side elevational view of an alternative embodiment of the carabiner incorporating a different gate than that illustrated in the previous figures.

Figure 3C:
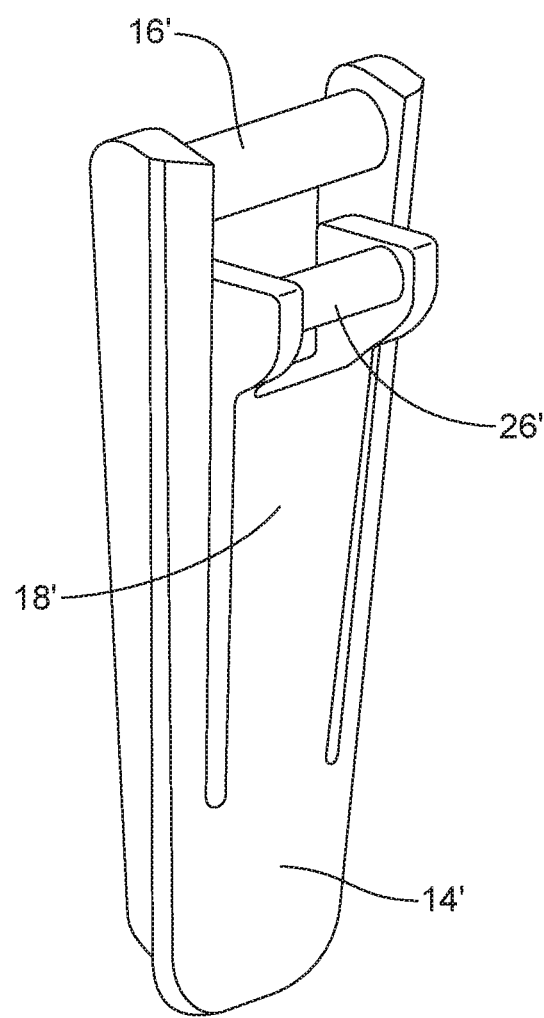
Figure 3D:
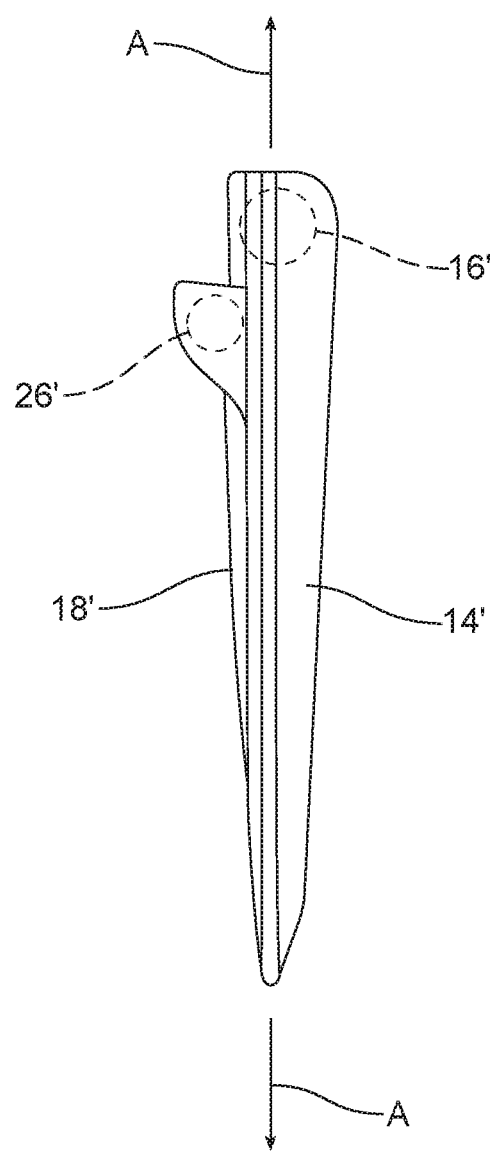

FIGS. 3b-3d are a series of different, detailed views of the gate of the alternative embodiment illustrated in FIG. 3a: that gate incorporating an offset pivot on the end of the cantilever spring.

FIG. 3b is a front elevational view.

FIG. 3c is a front perspective view.

FIG. 3d is a side elevational view.

Figure 4:
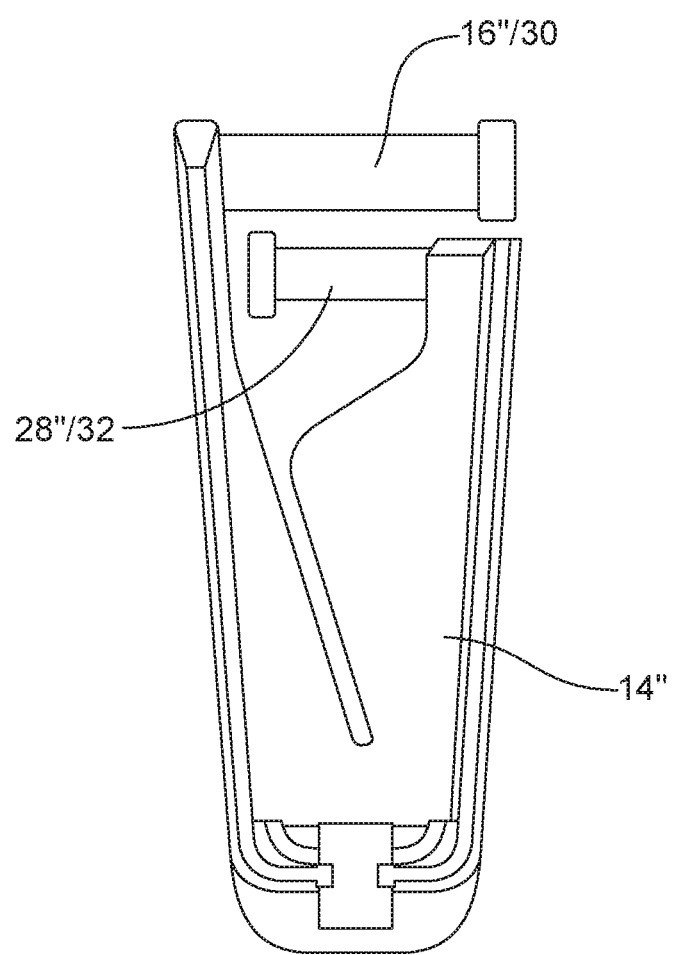

FIG. 4 is a detailed front elevational view of yet another alternative embodiment of gate that may be incorporated into the carabiner wherein the first and second pivots of the gate comprise respective first and second cantilevered shafts.

Figure 5:
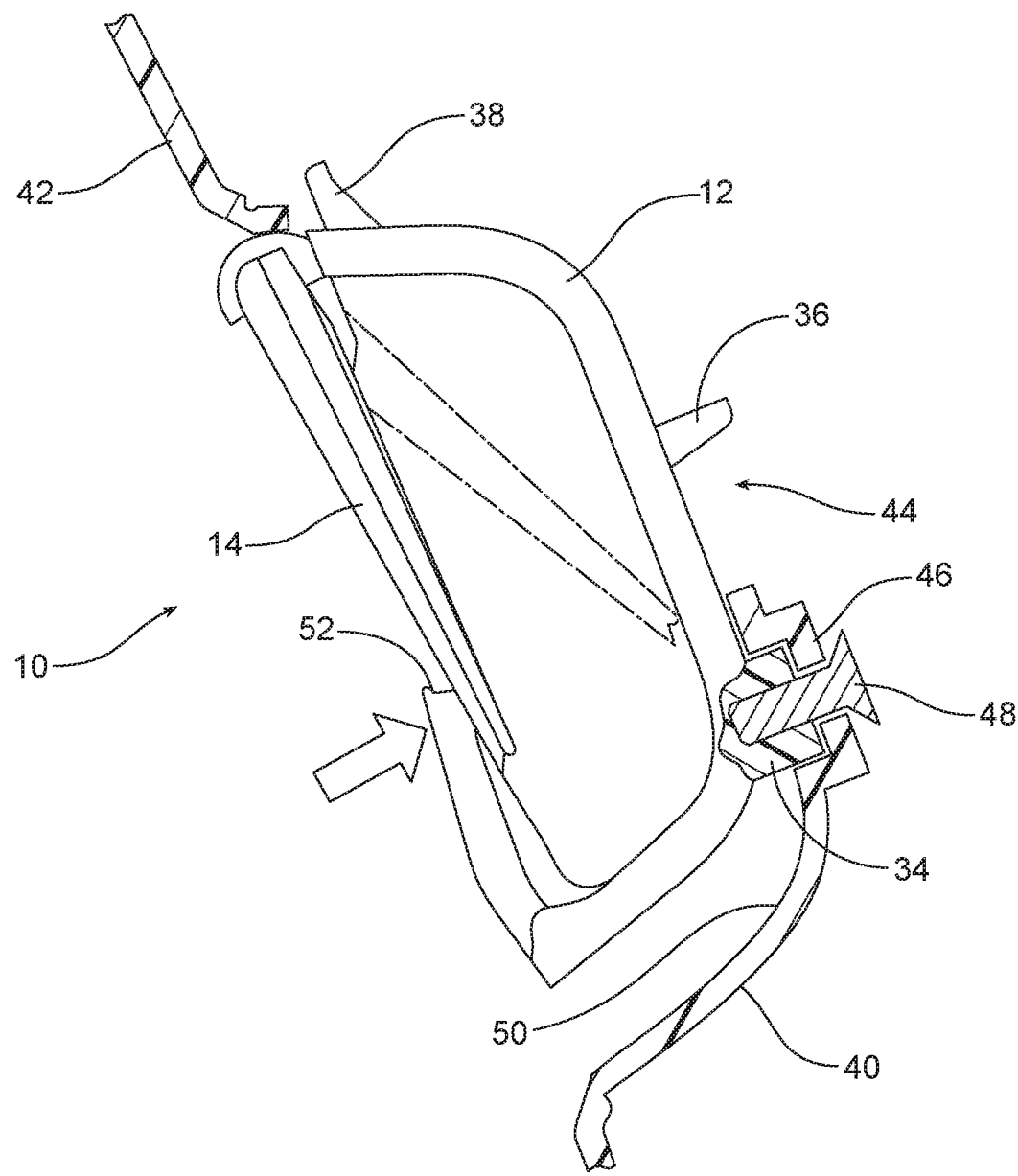

FIG. 5 is a detailed cross sectional view of the carabiner illustrated in FIGS. 1a-1e mounted by means of a fastener within a concave housing in a trim panel of a motor vehicle.

Figure 6A:
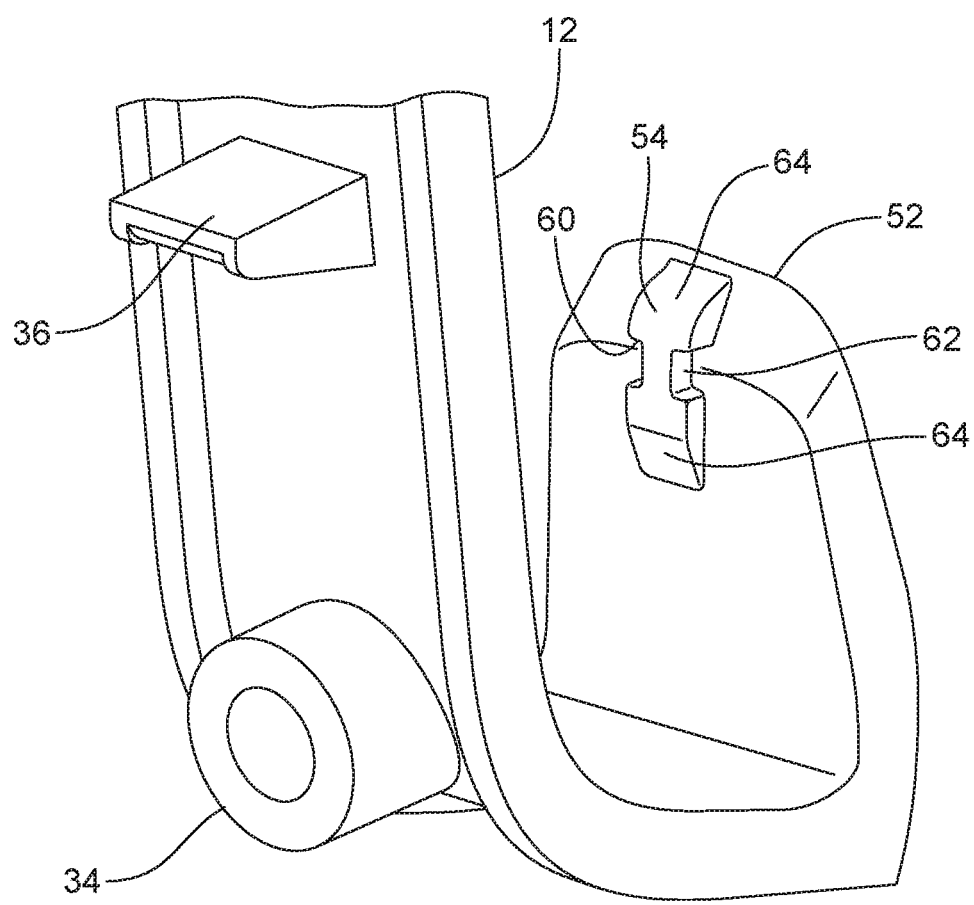

FIG. 6a is a detailed perspective view of an optional locking tab provided on the end of the hook.

Figure 6B:
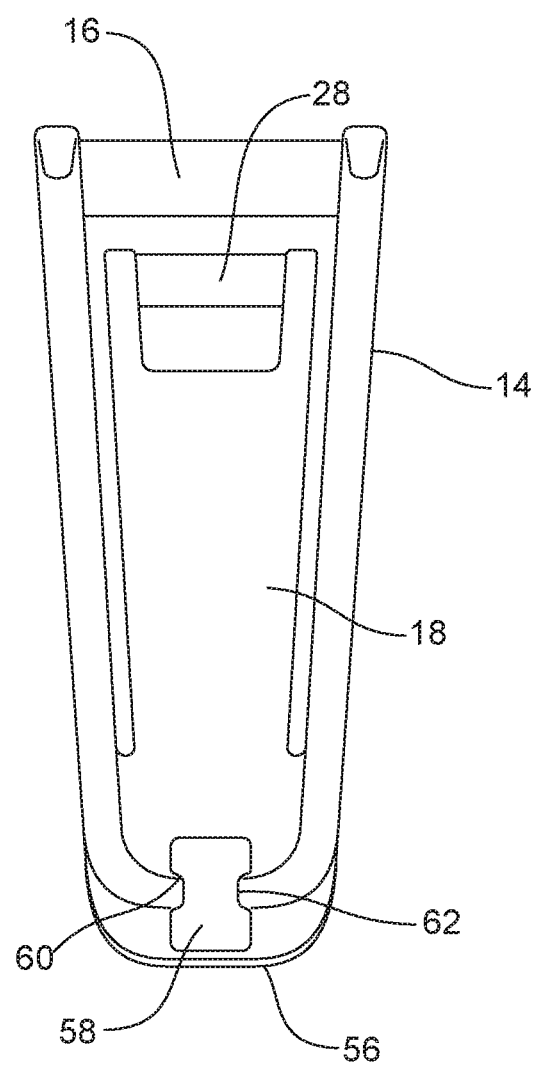

FIG. 6b is a detailed perspective view of a cooperating locking tab receiver provided on the distal end of the gate.

Figure 6C:
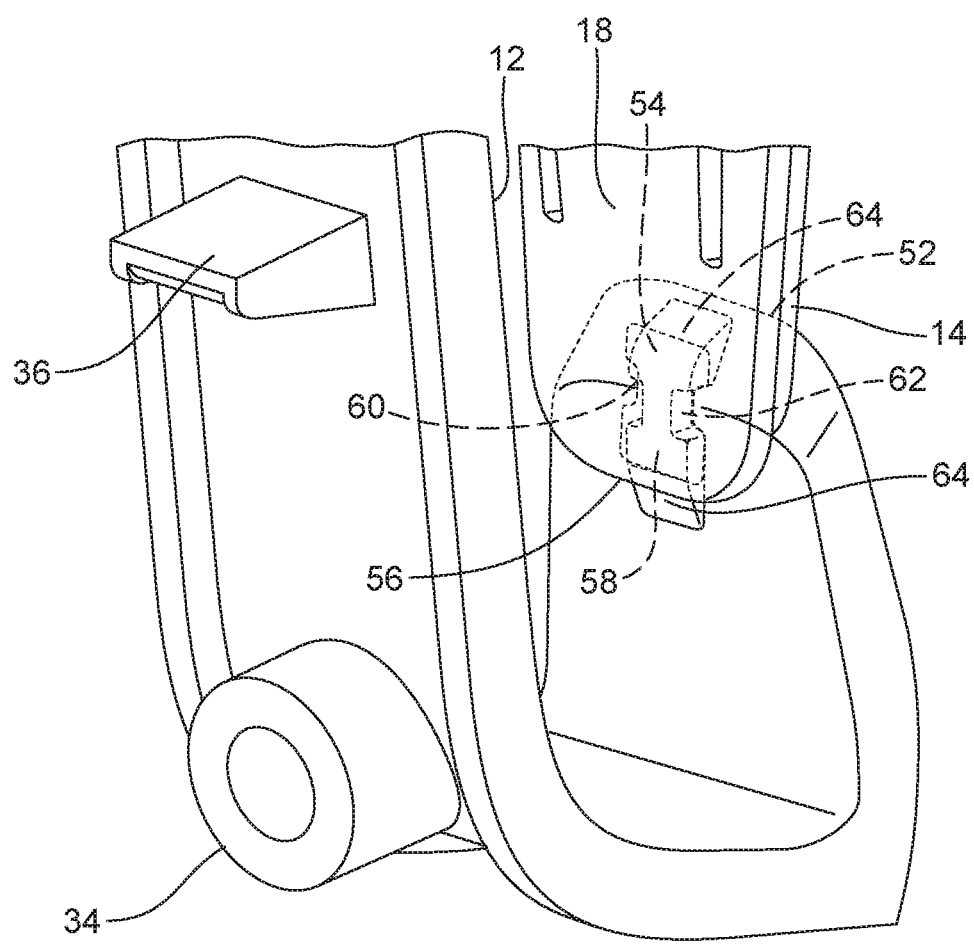

FIG. 6c shows how the locking tab nests in the locking tab receiver when the gate is closed.

Reference will now be made in detail to the present preferred embodiments of the carabiner, examples of which are illustrated in the accompanying drawing figures.

DETAILED DESCRIPTION

Reference is now made to FIGS. 1a-1e illustrating a first possible embodiment of the new and improved carabiner 10.

The carabiner 10 comprises a hook 12, a gate 14 and a first pivot 16 connecting the gate to the hook. As should be appreciated from viewing FIGS. 2a-2c, the gate 14 includes a cantilever spring 18. The cantilever spring 18 extends along the longitudinal axis A of the gate 14 and has a free or distal end 20 oriented toward the first pivot 16.

The hook 12 includes a first receiver 22 adapted to receive and hold the first pivot 16 that is carried on the proximal end 24 of the gate 14. The hook 12 also includes a second receiver 26. In the illustrated embodiment, the first receiver 22 is adjacent to the second receiver 26. The cantilever spring 18 includes a second pivot 28 provided at the distal end 20. The second pivot 28 is received and held in the second receiver 26.

In the illustrated embodiment, the gate 14, the cantilever spring 18, the first pivot 16 and the second pivot 28 comprise an integral one-piece body: meaning a body that is generated or created as a single piece and not assembled from multiple components. Such a one-piece body may be molded, for example, from plastic, composite or other appropriate material.

In the embodiment of the carabiner 10 illustrated in FIGS. 1a-1e and 2a-2c, the first pivot 16 is parallel to the second pivot 28. Further, the first pivot 16 and the second pivot 28 are perpendicular to the longitudinal axis A of the gate 14. Further, the first pivot 16 and the second pivot 28 are aligned with the longitudinal axis A of the gate 14. FIGS. 2a-2c provide various detailed views of the gate 14 to illustrate the geometry of the cantilever spring 18, the first pivot 16 and the second pivot 28.

Reference is now made to FIG. 3a illustrating a second possible embodiment for the carabiner 10'. In the embodiment illustrated in FIG. 3a, the hook 12' is identical to the hook 12 illustrated in the first embodiment of FIGS. 1a-1e. Thus, the hook 12' in FIG. 3a also includes a first receiver 22' and a second receiver 26'. Other structural features common to the first embodiment of the carabiner 10 illustrated in FIGS. 1a-1e and 2a-2c and the second embodiment of the carabiner 10' illustrated in FIGS. 3a-3d are identified by common reference numbers plus the "prime" designation.

The gate 14' of the second embodiment of the carabiner 10' illustrated in FIG. 3a and in greater detail in FIGS. 3b-3d differs from the gate 14 of the first embodiment of the carabiner 10 illustrated in FIGS. 1a-1e and FIGS. 2a-2c. More particularly, the gate 14' also includes a cantilever spring 18', first pivot 16' and a second pivot 28'. However, the geometry of the first pivot 16' and second pivot 28' differ from the geometry of the first pivot 16 and second pivot 28 of the first embodiment illustrated in FIGS. 1a-1e and 2a-2c. More particularly, the first pivot 16' and the second pivot 28' are still parallel to one another but the first pivot is aligned with the longitudinal axis A of the gate 14 while the second pivot 28' is offset from the longitudinal axis of the gate. More particularly, as illustrated, the second pivot 28' is offset toward the concave or u-shaped portion of hook 12.

FIG. 4 illustrates yet another possible embodiment for the gate 14". In the embodiment illustrated in FIG. 4, the gate 14' includes a first pivot 16" in the form of a first cantilevered shaft 30 and a second pivot 28" in the form of a second cantilevered shaft 32. As illustrated in FIG. 4, the two cantilevered shafts 30, 32 are oriented in opposed directions: that is, the free ends of the shafts are oriented in opposite directions.

Referring back to the first embodiment of the carabiner 10 illustrated in FIGS. 1a-1e, the hook 12 includes a mounting boss 34, a locating rib 36 and a mounting lug 38. As best illustrated in FIG. 5, the mounting boss 34, locating rib 36 and mounting lug 38 function to allow the carabiner 10 to be secured in a concave housing 40 carried on a trim panel 42 of the type provided in a motor vehicle.

More particularly, the concave housing 40 includes a receiver 44, adapted to receive and hold the locating rib 36 and mounting lug 38, and a socket 46 to receive and hold the mounting boss 34. A fastener 48 in the form of a screw, secures the mounting boss 34 in the socket 46 effectively fixing the carabiner 10 within the concave housing 40. In the embodiment illustrated in FIG. 5, the entire carabiner 10 rests within the concavity 50 in the concave housing 40 in the trim panel 42.

Figure 1A:
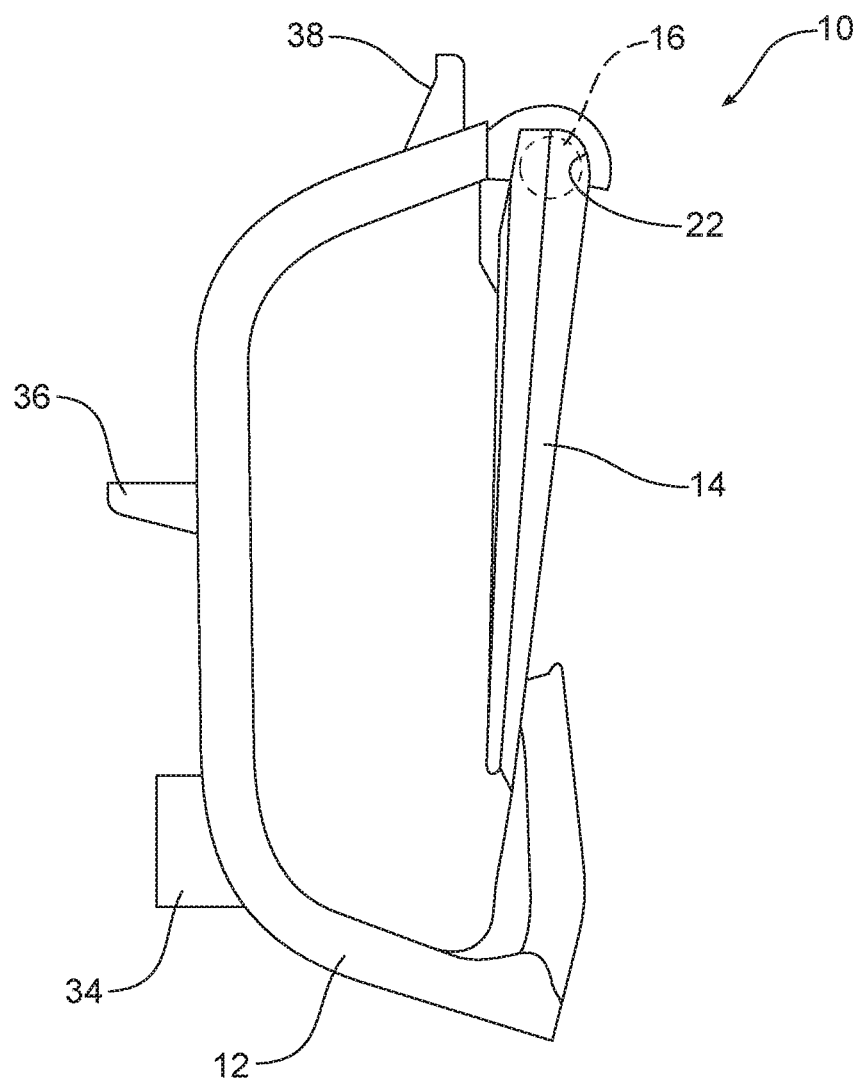
FIGS. 1a-1e are various views of a first possible embodiment of the new and improved carabiner More particularly.
Figure 1B:
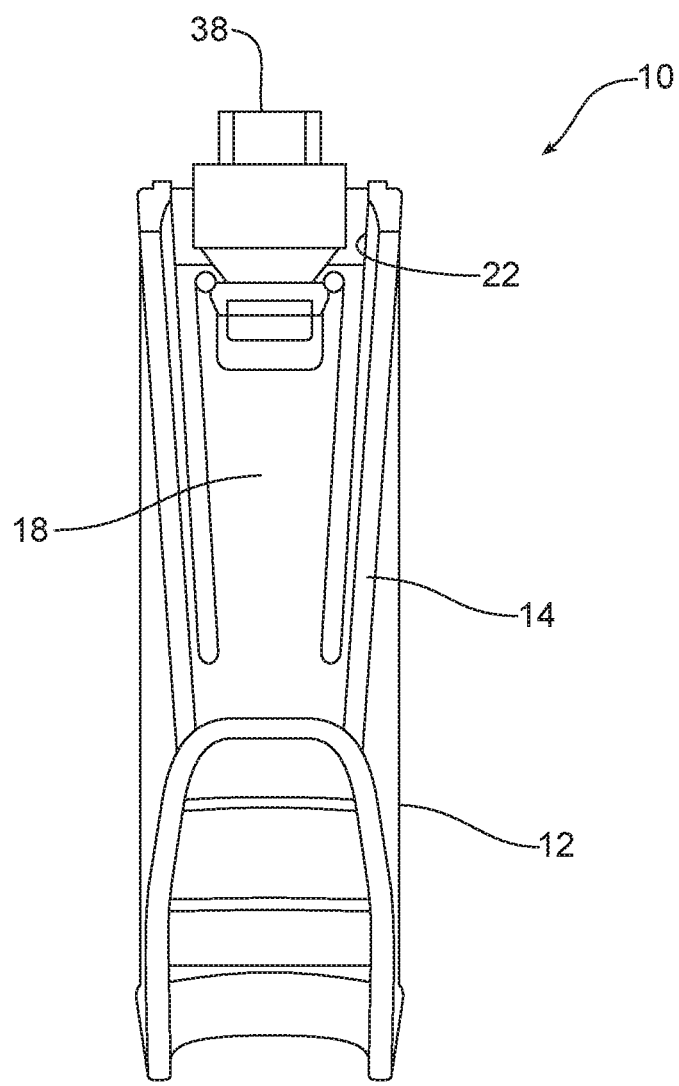
Figure 1C:
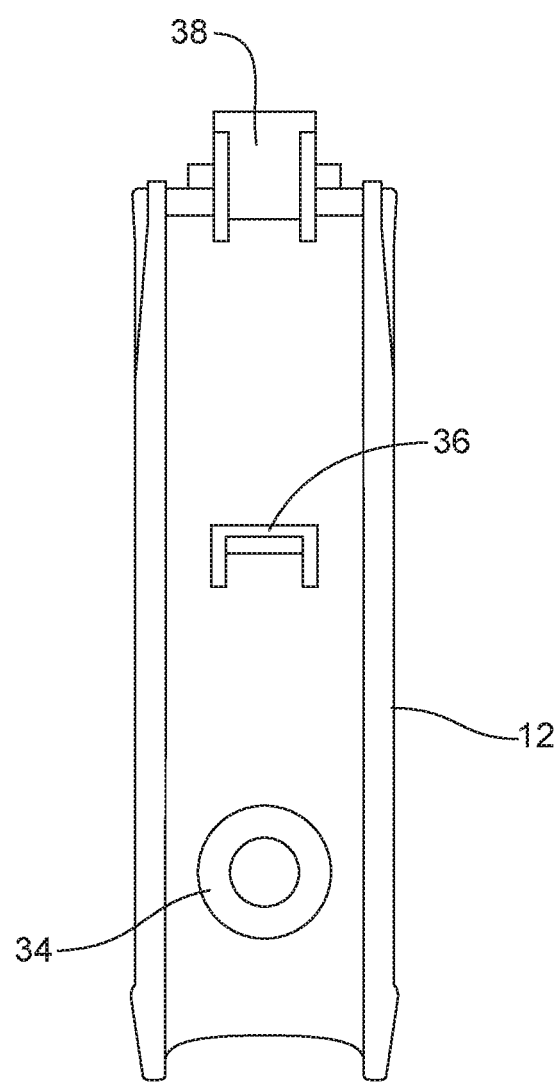
Figure 1D:
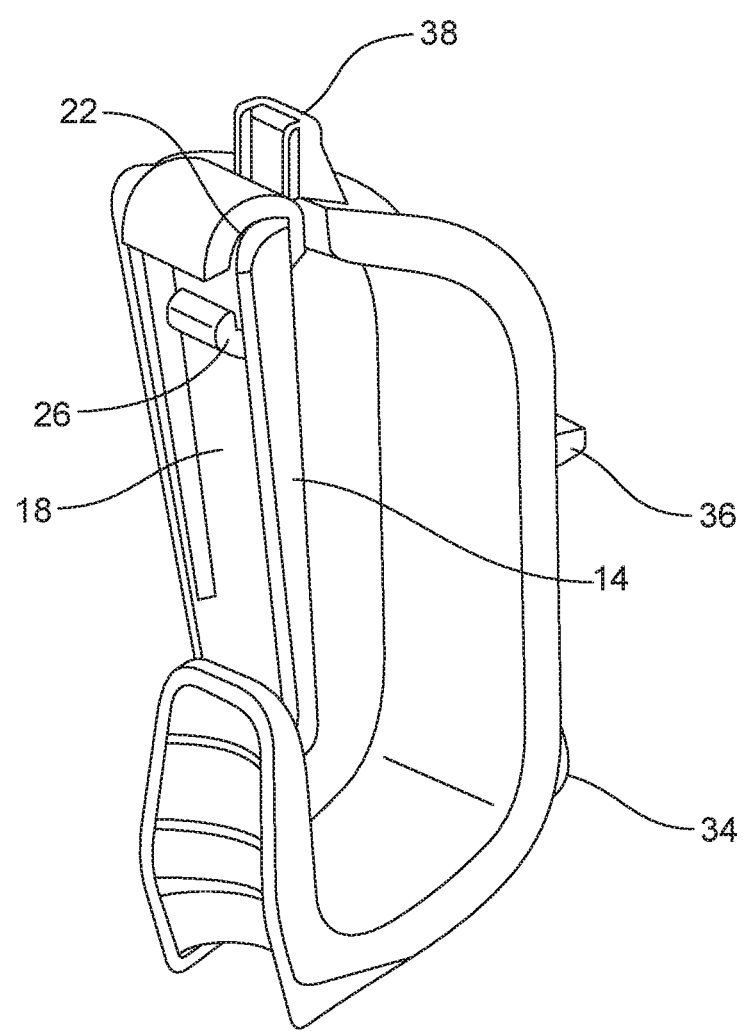
Figure 1E:
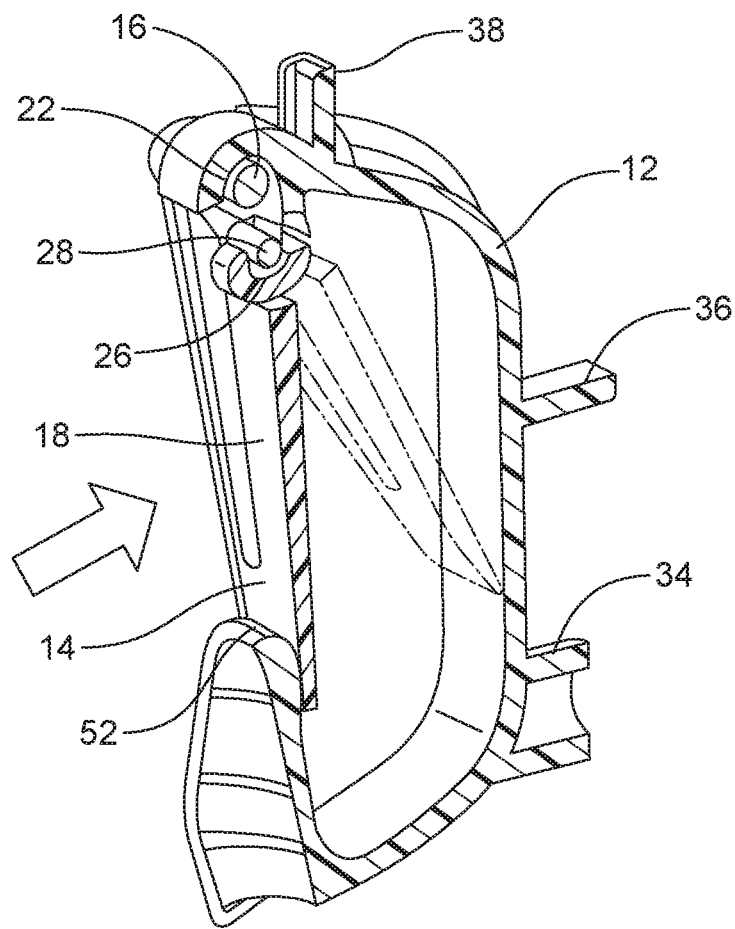

FIGS. 1e and 5 illustrate the gate 14 in a closed position in full line and in an open position in a phantom line. When opened, one may insert a loop or other attachment feature over the open end 52 of the hook 12. When one releases the gate 14, the resilient cantilever spring 18 functions to bias the gate from the open, phantom line position to the closed, full line position thereby capturing any loop or other attachment feature within the carabiner 10. When one wishes to release the loop or attachment feature, one simply depresses the gate 14 once again in the direction of action arrow A to displace the gate from the closed, full line position to the open, phantom line position. While holding the gate 14 in this open position, one may easily then remove the loop or attachment feature over the open end 52 of the hook 12 as desired. Afterward, when one releases the gate 14, the cantilever spring 18 once again biases the gate back into the closed, full line position.

The foregoing has been presented for purposes of illustration and description. It is not intended to be exhaustive or to limit the embodiments to the precise form disclosed. Obvious modifications and variations are possible in light of the above teachings. For example, as illustrated in FIG. 6a, the open end 52 of the hook 12 may include a locking tab 54. In the illustrated embodiment, the locking tab 54 is H-shaped.

As illustrated in FIG. 6b, the distal end 56 of the gate 14 may include a locking tab receiver 58 sized and shaped to receive and hold the locking tab 54 when the gate 14 is closed. Thus, in the illustrated embodiment, the locking tab receiver 58 is also H-shaped.

More particularly, when the gate 14 is closed, the locking tab 54 nests in the locking tab receiver 58 (see FIG. 6c). The horizontal edges 60 resist vertical displacement of the gate 14 while the vertical edges 62 resist horizontal displacement of the hook. As should be further appreciated, the ends 64 of the locking tab 54 are radiused to ensure that attachments freely slide over and do not catch on the locking tab.

All such modifications and variations are within the scope of the appended claims when interpreted in accordance with the breadth to which they are fairly, legally and equitably entitled.

What is claimed:

1. A carabiner, comprising:
   a hook including a first receiver and a second receiver;
   a gate including a cantilever spring, extending along a longitudinal axis of the gate, said cantilever spring including a second pivot received and held in said second receiver; and
   a first pivot held in said first receiver thereby connecting said gate to said hook.

2. The carabiner of claim 1, wherein said first pivot is integral with said gate.

3. The carabiner of claim 2, wherein said first pivot is parallel to said second pivot.

4. The carabiner of claim 3, wherein said first pivot and said second pivot are perpendicular to the longitudinal axis of said gate.

5. The carabiner of claim 4, wherein said first pivot and said second pivot are aligned with said longitudinal axis of said gate.

6. The carabiner of claim 5, wherein said first pivot is a first cantilevered shaft and said second pivot is a second cantilevered shaft.

7. The carabiner of claim 4, wherein said first pivot is aligned with said longitudinal axis of said gate and said second pivot is offset from said longitudinal axis of said gate.

8. The carabiner of claim 7, wherein said second pivot is offset toward said hook.

9. The carabiner of claim 8, wherein said first pivot is a first cantilevered shaft and said second pivot is a second cantilevered shaft.

10. The carabiner of claim 9, wherein said gate, said cantilever spring, said first pivot and said second pivot comprise an integral one-piece body.

11. The carabiner of claim 1, wherein said first pivot is a first cantilevered shaft.

12. The carabiner of claim 11, wherein said second pivot is a second cantilevered shaft.

13. The carabiner of claim 12, wherein said gate, said cantilever spring, said first pivot and said second pivot comprise an integral one-piece body.

14. The carabiner of claim 1, wherein said hook includes a mounting boss.

15. The carabiner of claim 14, wherein said hook includes a locating rib.

16. The carabiner of claim 15, further including a fastener received in said mounting boss.

17. The carabiner of claim 16, further including a concave housing receiving and holding said hook in a trim panel.

* * * * *